United States Patent
Kim et al.

(10) Patent No.: US 10,869,244 B2
(45) Date of Patent: Dec. 15, 2020

(54) METHOD AND USER EQUIPMENT FOR FALLBACK FOR VOICE CALL FROM 5G MOBILE COMMUNICATION TO 4G

(71) Applicant: LG ELECTRONICS INC., Seoul (KR)

(72) Inventors: Hyunsook Kim, Seoul (KR); Jinsook Ryu, Seoul (KR); Sangmin Park, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 5 days.

(21) Appl. No.: 16/325,845

(22) PCT Filed: Aug. 22, 2017

(86) PCT No.: PCT/KR2017/009126
§ 371 (c)(1),
(2) Date: Feb. 15, 2019

(87) PCT Pub. No.: WO2018/038497
PCT Pub. Date: Mar. 1, 2018

(65) Prior Publication Data
US 2019/0191349 A1     Jun. 20, 2019

Related U.S. Application Data

(60) Provisional application No. 62/378,223, filed on Aug. 23, 2016, provisional application No. 62/534,687, filed on Jul. 20, 2017.

(51) Int. Cl.
*H04W 36/14* (2009.01)
*H04W 60/00* (2009.01)
(Continued)

(52) U.S. Cl.
CPC ....... *H04W 36/14* (2013.01); *H04W 36/0016* (2013.01); *H04W 36/0022* (2013.01);
(Continued)

(58) Field of Classification Search
None
See application file for complete search history.

(56) References Cited

U.S. PATENT DOCUMENTS

| | | | |
|---|---|---|---|
| 2010/0309886 A1 | 12/2010 | Vikberg et al. | |
| 2012/0120789 A1* | 5/2012 | Ramachandran | ........................... H04W 36/0022 370/220 |
| 2020/0015128 A1* | 1/2020 | Stojanovski | ............ H04W 8/08 |

FOREIGN PATENT DOCUMENTS

| | | |
|---|---|---|
| EP | 3307010 A1 | 4/2018 |
| WO | 2016/126238 A1 | 8/2016 |

OTHER PUBLICATIONS

NEC, "NR Tight Interworking with LTE", R3-161706, 3GPP TSG-RAN WG3 Meeting #93, Gothenburg, Sweden, Aug. 12, 2016, See sections 1-2.2.

(Continued)

*Primary Examiner* — Peter Chen
(74) *Attorney, Agent, or Firm* — Dentons US LLP

(57) ABSTRACT

An embodiment of the present description provides a method for performing a fallback operation for a voice call, if a UE performed only a single registration, in an environment in which an N26 interface is not provided between an access and mobility management function (AMF) and a mobility management entity (MME). The method can comprise the steps of: for transmission or reception of a voice call, the UE transmitting a service request message to the AMF; and receiving from the AMF a response message to the service request message. The response message can comprise an indicator which indicates a fallback operation (Continued)

without the N26 interface. The method can comprise a step for transmitting an attach request message, which comprises a PDN connection request message, to the MME on the basis of the indicator.

6 Claims, 16 Drawing Sheets

(51) Int. Cl.
  *H04W 36/04* (2009.01)
  *H04W 76/18* (2018.01)
  *H04W 36/30* (2009.01)
  *H04W 36/00* (2009.01)
  *H04W 60/04* (2009.01)
  *H04W 36/34* (2009.01)

(52) U.S. Cl.
  CPC ......... *H04W 36/305* (2018.08); *H04W 36/34* (2013.01); *H04W 60/00* (2013.01); *H04W 60/04* (2013.01); *H04W 76/18* (2018.02)

(56) References Cited

OTHER PUBLICATIONS

Catt et al., "Consideration on LTE and NR Interworking", R3-161694, 3GPP TSG-RAN WG3 Meeting #93, Gothenburg, Sweden, Aug. 12, 2016, See sections 1-3.

LG Electronics Inc., "Tight Interworking between LTE and New RAT", R3-161834, 3GPP TSG-RAN WG3 Meeting #93, Gothenburg, Sweden, Aug. 22, 2016.

Sassan Ahmadi, "LTE Advanced: A Practical Systems Approach to Understanding 3GPP LTE Releases 10 and 11 Radio Access Technologies", Elsevier Science & Technology, Jan. 1, 2014, pp. 94-100, XP055654024.

Intel, Samsung, "EPS fallback", SA WG2 Meeting #122, Jun. 26-30, 2017, S2-174552.

Orange, LG Electronics, "P-CR TS 23:502: Clarification on Inter-system mobility without N26", SA WG2 Meeting # 124, Nov. 27-Dec. 1, 2017, S2-179088.

* cited by examiner

METHOD AND USER EQUIPMENT FOR FALLBACK FOR VOICE CALL FROM 5G MOBILE COMMUNICATION TO 4G

CROSS-REFERENCE TO RELATED APPLICATIONS

This application is the National Stage filing under 35 U.S.C. 371 of International Application No. PCT/KR2017/009126, filed on Aug. 22, 2017, which claims the benefit of U.S. Provisional Applications No. 62/378,223 filed on Aug. 23, 2016, and No. 62/534,687 filed on Jul. 20, 2017, the contents of which are all hereby incorporated by reference herein in their entirety.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 Shows the Configuration of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is a diagram illustrating an expected structure of next generation mobile communication from a node viewpoint.

As can be seen with reference to FIG. 2, a UE is connected to a data network (DN) through a next generation Radio Access Network (RAN).

A shown control plane function (CPF) node performs all or some of a function of a Mobility Management Entity (MME) of 4th generation mobile communication and all or some of a control plane function of a Serving Gateway (S-GW) and a PDN gateway (P-GW). The CPF node includes an Access and Mobility Management Function (AMF) and a Session Management Function (SMF).

A shown User Plane Function (UPF) node is a type of gateway in which user data are transmitted and received. The UPF node may perform all or some of user plane functions of the S-GW and the P-GW of 4th generation mobile communication.

A shown Policy Control Function (PCF) is a node that controls a policy of a provider.

A shown application function (AF) is a server for providing various services to a UE.

Shown Unified Data Management (UDM) is a type of server for managing subscriber information, such as a Home Subscriber Server (HSS) of 4th generation mobile communication. The UDM stores and manages the subscriber information at a Unified Data Repository (UDR).

A shown Authentication Server Function (AUSF) authenticates and manages the UE.

A shown Network Slice Selection Function (NSSF) is a node for network slicing to be described later.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 3a illustrates an example of architecture for implementing network slicing.

As may be noticed with reference to FIG. 3a, the core network (CN) may be divided into several slice instances. Each slice instance may include one or more of a CP function node and a UP function node.

Each UE may use a network slice instance relevant to its service through the access network (AN).

Different from FIG. 3a, each slice instance may share one or more of the CP function node and the UP function node with other slide instance. This feature will be described with reference to FIG. 3b below.

FIG. 3b Illustrates Another Example of the Architecture for Implementing Network Slicing.

Referring to FIG. 3b, a plurality of UP function nodes are clustered, and a plurality of CP function nodes are also clustered.

And referring to FIG. 3b, slice instance #1 within the core network (which is also called instance #1) includes a first cluster of UP function nodes. And the slice instance #1 shares the cluster of CP function nodes with slice #2 (which is also called instance #2). The slice instance #2 includes a second cluster of UP function nodes.

The Core Network Selection Function (CNSF) shown in the figure selects a slice (or instance) capable of accommodating a service of the UE.

The UE in the figure may use the service #1 through the slice instance #1 selected by the CNSF and also use the service #2 through the slice instance #2 selected by the CNSF.

<Interworking with Existing 4th Generation Mobile Communication System>

Even if the UE is out of coverage of a next generation Radio Access Network (RAN), the UE should be able to receive a service even through a 4th generation (4G) mobile communication system. This is referred to as interworking. Hereinafter, interworking will be described in detail.

FIG. 4a illustrates an architecture for interworking when an UE does not roam, and FIG. 4b illustrates an architecture for interworking when an UE roams.

Referring to FIG. 4a, when the UE does not roam, an E-UTRAN and an EPC for existing 4th generation LTE and a 5G mobile communication network may be interworked with each other. In FIG. 4A, a packet data network gateway (PGW) for an existing EPC is divided into a PGW-U, which is responsible for only a user plane and a PGW-C, which is responsible for a control plane. The PGW-U is merged into an UPF node of a 5th generation core network, and the PGW-C is merged into an SMF node of the 5th generation core network. A Policy and Charging Rules Function (PCRF) for an existing EPC may be merged into a PCF of the 5th generation core network. An HSS for the existing EPC may be merged into UDM of the 5th generation core network. The UE may be accessed to the core network through the E-UTRAN, but the UE may be accessed to the core network through a 5G radio access network (RAN) and an AMF.

Referring to FIGS. 4a and 4b while comparing, when the UE roams to a Visited Public Land Mobile Network (VPLMN), data of the UE are transmitted via a Home PLMN (HPLMN).

An N26 interface of FIGS. 4a and 4b is an interface connected between an MME and an AMF so as to facilitate interworking between an EPC and an NG core. Such an N26 interface may be selectively supported according to a provider. That is, for interworking with the EPC, the network provider may provide the N26 interface or may not provide the N26 interface.

A. First, when the N26 interface is provided, interworking will be described as follows.

When the N26 interface is provided between an AMF of a Next Generation (NG) core (e.g., 5th generation core) and an MME of a 4th generation EPC, seamless continuity of a session may be supported through inter-system handover. For seamless continuity of a session through the handover, exchange of mobility management (MM) and session management (SM) contexts is available between the NG core (e.g., 5th generation core) and the 4th generation EPC through the N26 interface. Therefore, when the N26 interface is provided, even if the UE performs registration to only one of the NG core (e.g., 5th generation core) and the 4th generation EPC, the AMF of the NG core (e.g., 5th generation core) or the MME of the 4th generation EPC manages so that MM status information of the UE is continuously valid. It is referred to as a single-registration mode that the UE registers/manages to only one core in this way.

In an environment in which a provider supports a single-registration mode and in which an N26 interface is provided, an interworking procedure that enables a UE that has stayed in an idle state in the NG core (e.g., 5th generation core) to enter the 4th generation EPC is as follows. When the UE has a PDU session in 5G, the UE generates a Globally Unique Temporary Identity (GUTI) for 4G based on a GUTI for 5G and transmits the generated GUTI for 4G to the MME while performing a TAU procedure. Therefore, the MME may generate a GUTI for 5G using the GUTI for 4G and obtain MM and SM contexts of the UE from the AMF using the generated GUTI for 5G. Therefore, the MME may accept a TAU of the UE.

B. Next, when the N26 interface is not provided, interworking will be described as follows.

When the N26 interface is not provided, MM and SM contexts of the UE may not be directly exchanged between the NG core (e.g., 5th generation core) and the 4th generation EPC. Therefore, when there is no N26 interface, seamless continuity of a session through inter-system handover is not supported. Further, when there is no N26 interface, the NG core (e.g., 5th generation core) and the 4th generation EPC should separately manage a context of the UE. For this reason, the UE should register to both the NG core (e.g., 5th generation core) and the 4th generation EPC. This is referred to as a dual-registration mode. Registration to the 4th generation EPC is performed through an attach process. In this case, conventionally, a UE always performed a PDN connection during an attach procedure, except for a special case (e.g., CIoT terminal). However, when performing an attach procedure to a 4th generation EPC for dual-registration, it is unnecessary that a PDN connection is always performed. Therefore, when the UE performs an attach procedure to the 4th generation EPC for double-registration, it may be improved not to perform a PDN connection. After a dual-registration is completed in this manner, when the UE includes an indicator "handover" in a PDN connection request message and transmits the PDN connection request message to the fourth-generation EPC, an interworking procedure may be initiated in which the UE enters from the NG core (e.g., 5th generation core) to the 4th generation EPC.

Even when the UE uses a single-registration mode, interworking should be available. However, because the UE is registered to only one core network, the UE may not interwork with another core network through only a TAU procedure or a PDN connection request procedure, as described above. The UE should perform an attach procedure and a PDN connection procedure to the EPC for interworking to the EPC. More specifically, when the UE moves from the NG core (e.g., 5th generation core) to the 4th generation EPC, the UE generates a GUTI for 4G from a GUTI for 5G and performs a TAU procedure using the generated GUTI for 4G. Therefore, an MME of the 4th generation EPC determines that a TAU is impossible because a previous serving node of the UE is an AMF of the NG core (e.g., 5th generation core) and transmits an indicator "Handover PDN Connection Setup Support" to the UE while transmitting a TAU reject message. The indicator means that it is required to perform a PDN connection setup procedure for handover. Therefore, the UE transmits an attach request message including a PDN connection request message based on the instructor. In this case, the attach request message includes an indicator "handover" indicating that the attach request message is for handover.

<Fallback of Voice Call Service>

Even if a next generation, i.e., 5th generation (so-called 5G) mobile communication network is commercialized, a high success rate of a voice call recognized as an important element to a user may not be assured. Therefore, a voice call may be considered to fall back to an existing 4th generation mobile communication network in an early stage of commercialization.

FIG. 5a illustrates a fallback operation of a mobile orienting (MO) call, and FIG. 5b illustrates a fallback operation of a mobile terminating (MT) call.

Referring to FIG. 5a, when the UE determines MO of a call, the UE transmits a service request message of an AMF to an NG-core (e.g., 5G core). The AMF transmits a fallback request to an NG RAN. Accordingly, the UE may perform inter-system handover, i.e., handover to a 4th generation E-UTRA. When the handover is completed, a call establishing procedure is performed.

Referring to FIG. 5b, the AMF of the NG core (e.g., 5G core) receives a notification to downlink data of the UE, for example, a Downlink Data Notification (DDN) message. Therefore, the AMF performs a paging procedure of the UE. When the UE performs an RRC connection procedure to be an RRC connection state, a Session Initiation Protocol (SIP) based INVITE message is received. When the UE determines MT of a call, the UE transmits a service request message to the AMF of the NG core (e.g., 5th generation core). The AMF transmits a fallback request to the NG RAN. Accordingly, the UE may perform handover to a 4th generation E-UTRA. When the handover is completed, a call establishing procedure is performed.

In this way, for a fallback operation, the UE should perform an inter-system handover procedure from a 5G system to a 4G system. However, as described above in relation to interworking, there is a problem that an inter-system handover procedure from the 5G system to the 4G system is available only in a situation where an N26 interface is provided. Therefore, in a situation in which an N26 interface is not provided, even if the UE performs an inter-system handover procedure for fallback, there is a problem that fallback is failed.

From a single-registration mode viewpoint, when an N26 interface is provided, fallback is available, but when an N26 interface is not provided, fallback is unavailable. However, the single-registration mode has not been developed without considering such a difference.

Further, when the UE roams to a Visited PLMN (VPLMN) that does not provide an N26 interface while using a single-registration mode in a Public Land Mobile Network (HPLMN) that provides an N26 interface (or when an N26 interface exists in the VPLMN, but is not provided to a roaming UE), there is a problem that a fallback operation of the UE is failed and that a voice call is unavailable in the VPLMN.

SUMMARY OF THE INVENTION

Accordingly, the disclosure of the present specification provides a method of solving the above-mentioned problems.

The present invention provides a method in which an UE changes a core network according to an interworking procedure instead of performing a handover procedure in order to fall back to a 4G EPC in a situation in which an N26 interface is not provided and in which an UE may perform only a single-registration.

In an aspect, there is provided a method of performing a fallback operation of a voice call when only a single-registration is performed in an environment in which an N26 interface between an Access and Mobility Management Function (AMF) and a Mobility Management Entity (MME) is not provided. The method may be performed by a user equipment (UE) and include transmitting, by the UE, a service request message to the AMF for originating or terminating a voice call; receiving a response message to the service request message from the AMF. Here, the response message may include an indicator indicating a fallback operation without the N26 interface. The method may include transmitting an attach request message including a PDN connection request message to the MME based on the indicator.

Inter-system handover may not be performed based on the indicator.

The response message may be a service request reject message or an N2-AP request message.

The response message may include information about a fallback method selected by the AMF.

The method may further include transmitting a Tracking Area Update (TAU) request message to the MME before transmitting the attach request message; and receiving from the MME a TAU reject message including an indicator indicating that it is required to perform a PDN connection establishment procedure for handover.

The indicator may be Handover PDN Connection Setup Support.

The attach request message may include an indicator indicating that the attach request message is for handover.

The method may further include receiving information about an operation mode from a base station of a Next Generation Radio Access Network (NG RAN); and determining whether to perform a fallback operation based on the information about the operation mode.

The operation mode may include a first mode in which a base station of the NG RAN supports only access to an NG core; a second mode in which the base station of the NG RAN supports only access to an Evolved Packet Core (EPC) of 4G; and a third mode in which the base station of the NG RAN supports both access to the NG core and access to the EPC of 4G.

In another aspect, there is provided a user equipment (UE) for performing a fallback operation of a voice call when only a single-registration is performed in an environment in which an N26 interface between an Access and Mobility Management Function (AMF) and a Mobility Management Entity (MME) is not provided. The UE may include a transceiver; and a processor configured to control the transceiver. The processor may transmit a service request message to the AMF for originating or terminating of a voice call and receive a response message to the service request message from the AMF. Here, the response message may include an indicator indicating a fallback operation without the N26 interface. The processor may transmit an attach request message including a PDN connection request message to the MME based on the indicator.

In the present specification, a fallback method of a voice service is described, but contents of the present specification can be applied to a method in which a provider falls back a specific service wanting to serve only in a specific core network. This can be applied to the present invention by dividing a specific service in which a provider wants to service into an APN/PDN, as in dividing an IMS APN/PDN for a voice service in the network.

Advantageous Effects

According to the disclosure of the present invention, the problem of the conventional technology described above may be solved.

DESCRIPTION OF EXEMPLARY EMBODIMENTS

Figure 1:
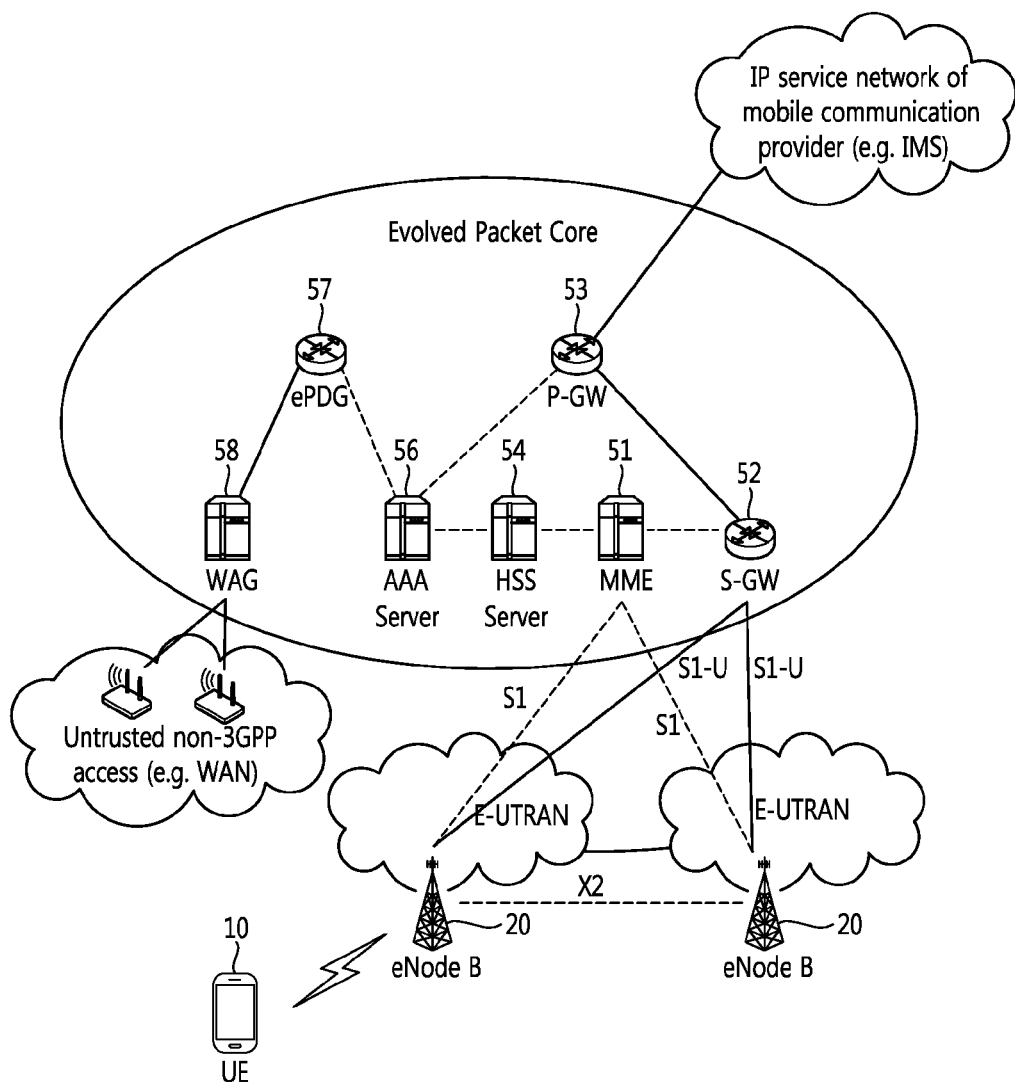
FIG. 1 is a diagram illustrating a structure of an evolved mobile communication network.
Figure 2:
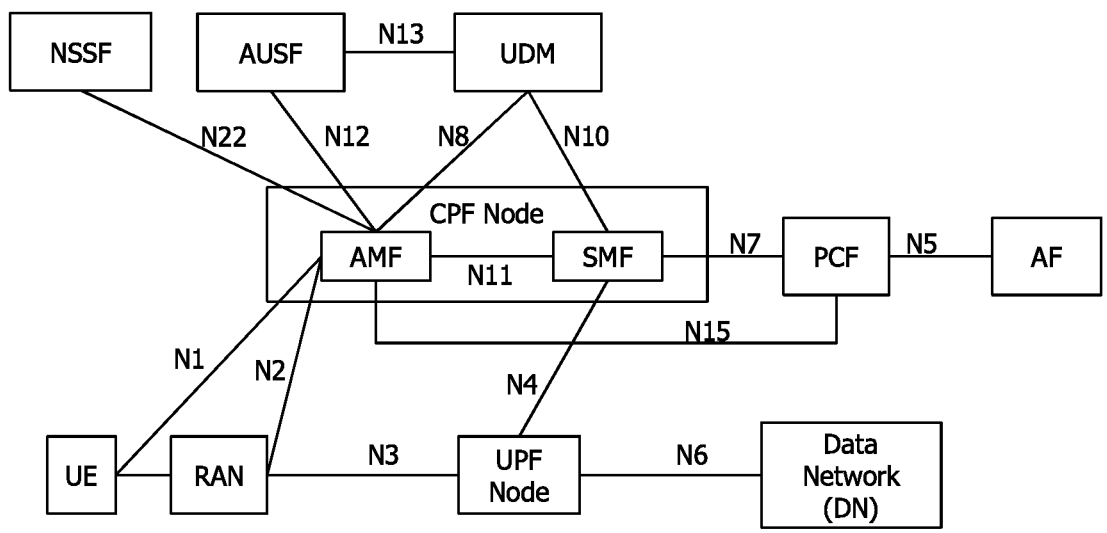
FIG. 2 is a diagram illustrating an expected structure of next-generation mobile communication from a node viewpoint.
Figure 3A:
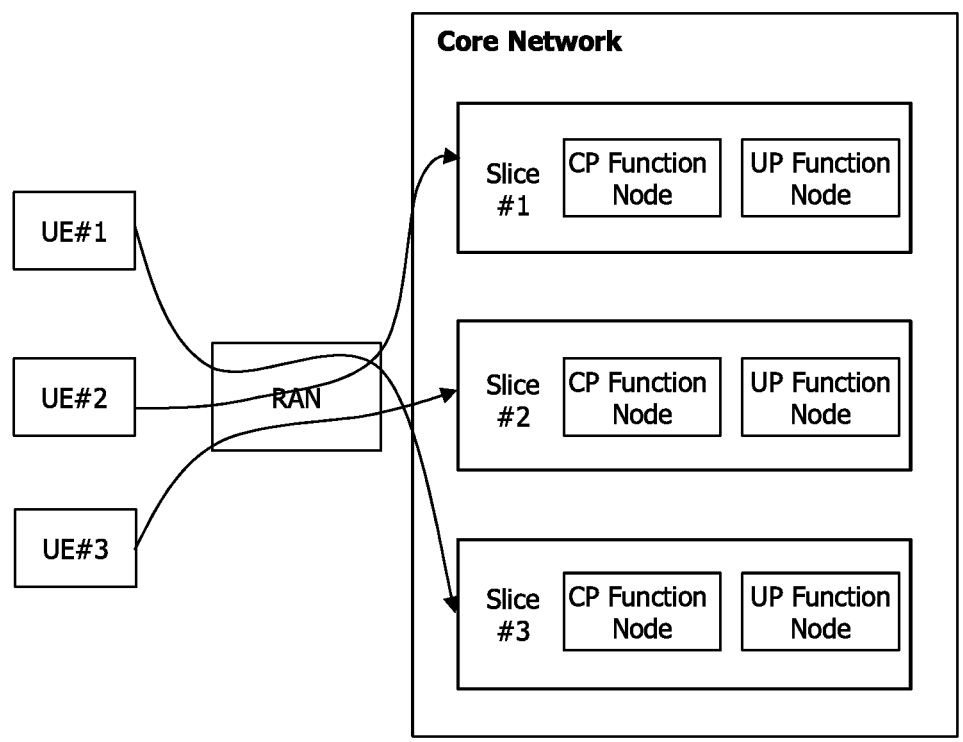
FIG. 3a is a diagram illustrating an example of an architecture for implementing the concept of network slicing.
Figure 3B:
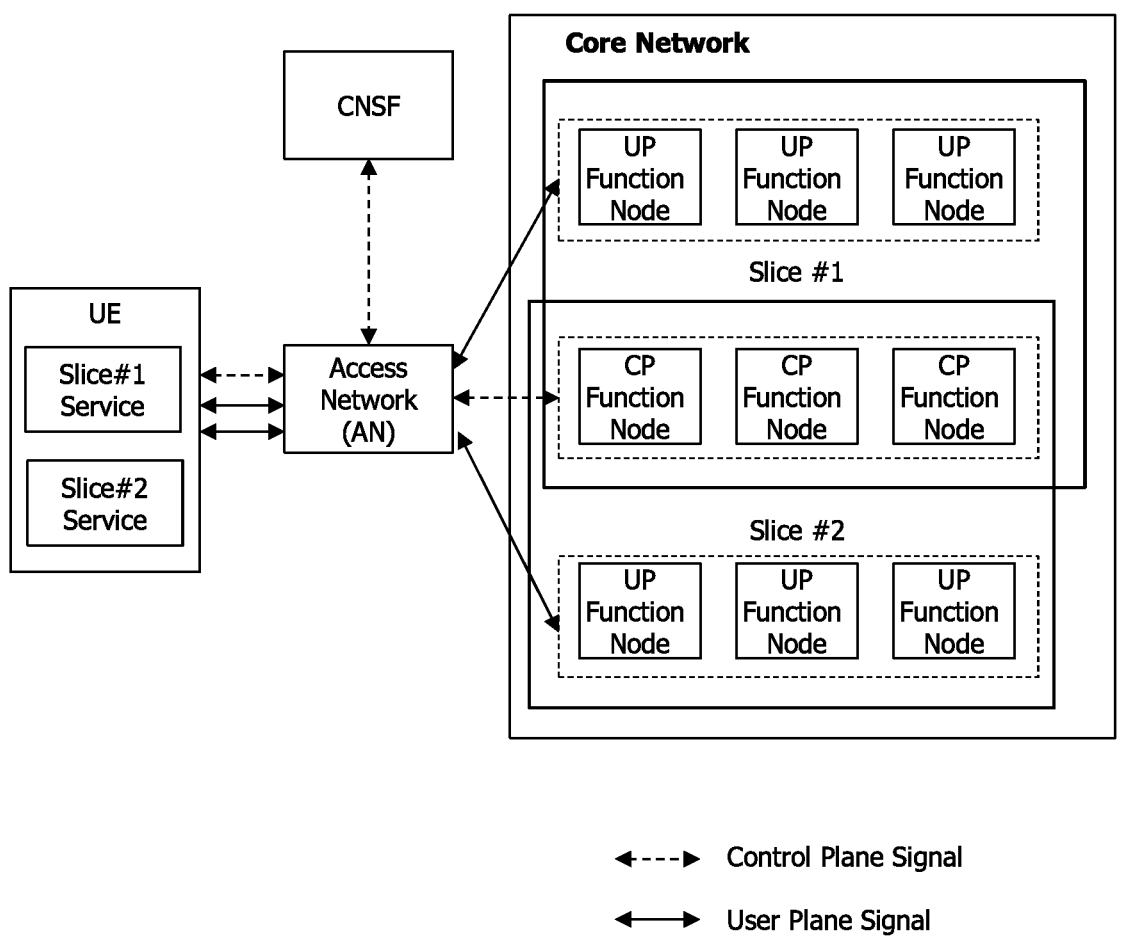
FIG. 3b is a diagram illustrating another example of an architecture for implementing the concept of network slicing.
Figure 4A:
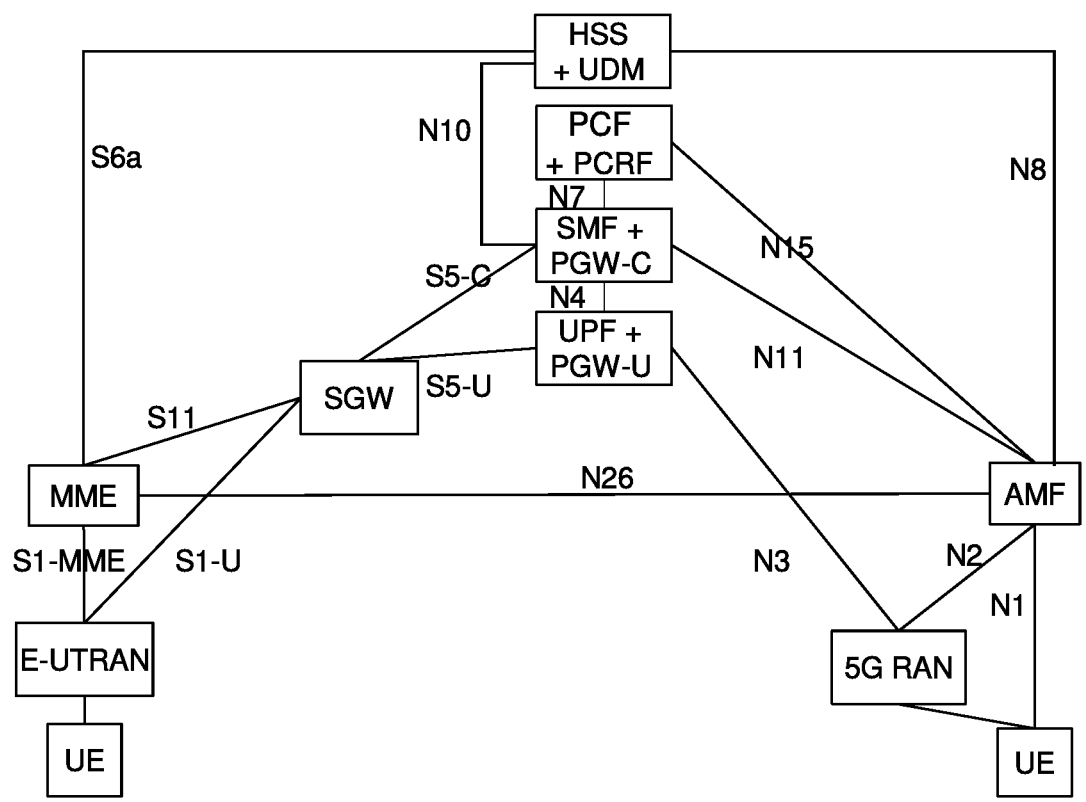
FIG. 4a illustrates an architecture for interworking when an UE does not roam.
Figure 4B:
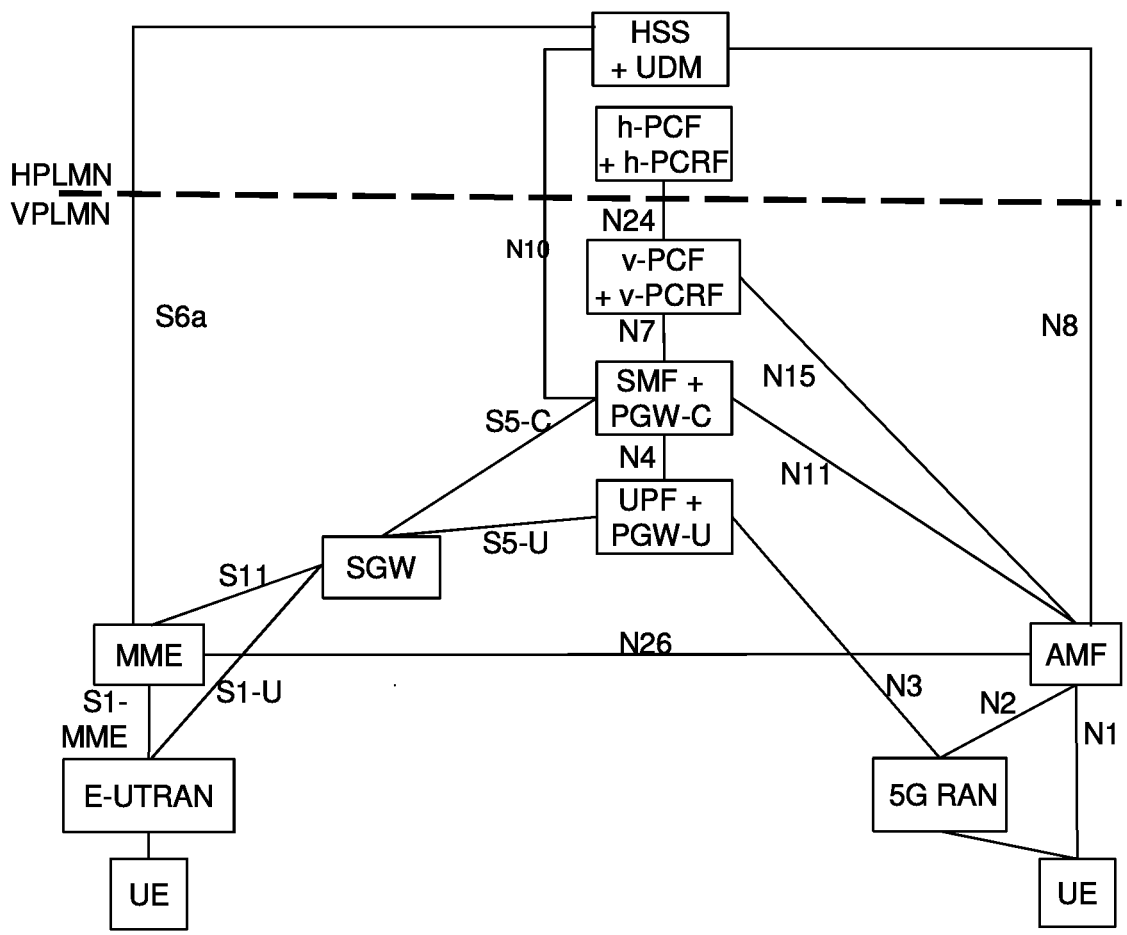
FIG. 4b illustrates an architecture for interworking when an UE roams.
Figure 5A:
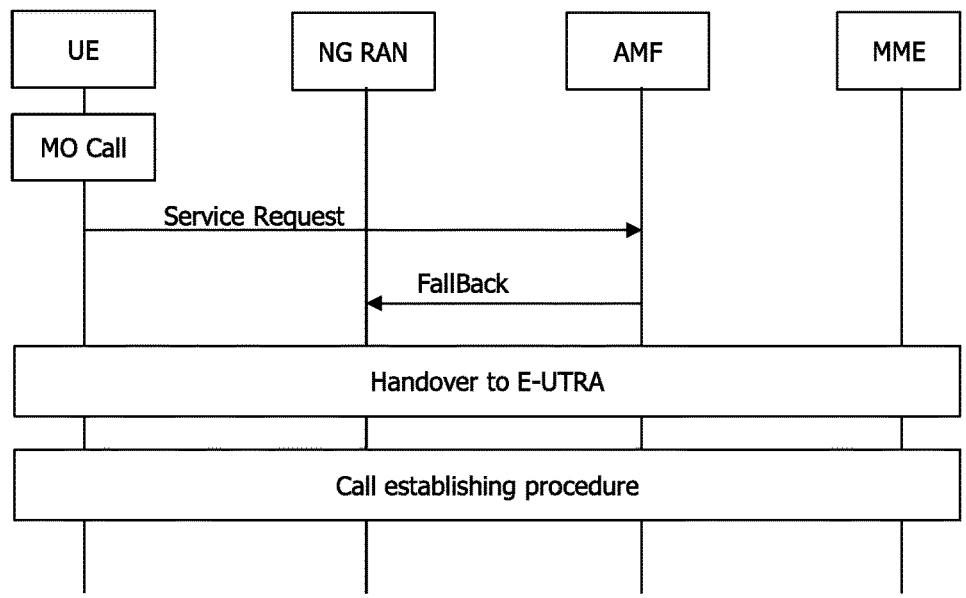
FIG. 5a illustrates a fallback operation of a mobile orienting (MO) call.
Figure 5B:
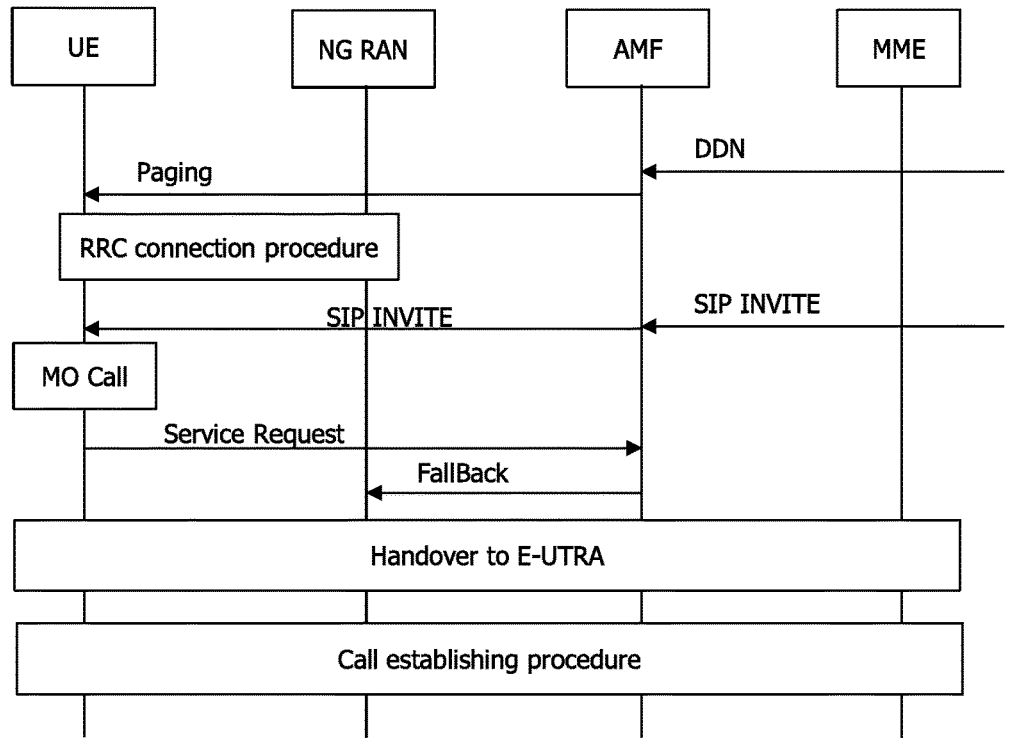
FIG. 5b illustrates a fallback operation of a mobile terminating (MT) call.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply. The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

<Disclosure of the Present Specification>

Hereinafter, methods according to the disclosure of the present specification will be described.

Specifically, the disclosure of the present specification describes a method in which a UE falls back to a 4G RAT (i.e., E-UTRAN) or a 4G core (e.g., EPC) that may stably receive a voice call service while being connected to an NG RAT or an NG core (e.g., 5G core). In the NG RAT or NG core, the voice call service may not be physically provided or may be physically provided, but may not be provided by a policy of a provider due to low reliability.

Hereinafter, a voice call service is mainly described, but a description of the present specification may be extended that a service falls back a PDN/PDU session that may be distinguished by an Access Point Name (APN)/Data Network Name (DNN) to a specific RAT or a specific core network.

I. First Disclosure: Selection of Fallback Method

Figure 6:
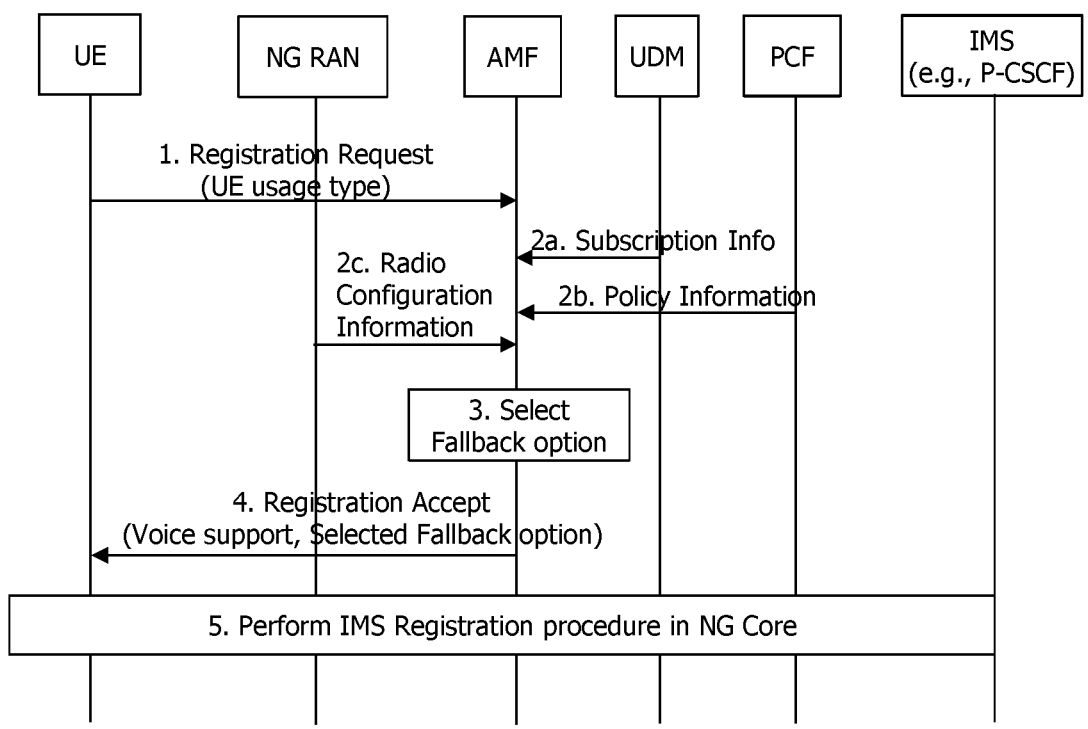
FIG. 6 is a diagram illustrating a method of selecting a fallback method during a registration procedure according to a first scheme of a first disclosure of the present specification.

FIG. 6 is a diagram illustrating a method of selecting a fallback method during a registration procedure according to a first scheme of a first disclosure of the present specification.

1) The UE transmits a registration request message (e.g., attach request message) to an AMF so as to register to an NG core (e.g., 5G core). UE usage setting is included in the registration request message. The UE usage setting includes setting or preference information on whether the UE is a voice call service centric terminal or a data service centric terminal.

2) The AMF receives the registration request message and then obtains and verifies subscriber information from UDM. Further, the AMF obtains and verifies policy information from a PCF. The AMF obtains and verifies wireless configuration information from an RAN. Further, the AMF may determine information set in advance therein. Further, the AMF may obtain and verify information through interaction with a third network.

3) The AMF determines whether a voice call is supported or not in an NG RAT or NG core to which the UE is accessed based on the obtained and verified information. If a voice call is not supported, the AMF selects one of the following several fallback methods for a voice call.

i. Intra-system PS handover between an NR cell and an E-UTRA cell in which a change in a core network is not accompanied ii. Inter-system PS handover between a NG core (e.g., a 5G core) and a 4G core (e.g., an EPC) in which a change in a core network is accompanied iii. As described later in a chapter II, there may be several methods such as fallback (i.e., a method of changing the core network by a start operation by the UE when an N26 interface is not provided and a single-registration is performed) initiated by the UE suggested in the present specification.

4) The AMF transmits a registration accept message (e.g., attach accept message) to the UE. In this case, the registration accept message (e.g., attach accept message) may include indication indicating that fallback is required for a voice call service or indication indicating that a voice call service is provided by Voice over LTE (VoLTE). The fact that a voice call service is provided by the VoLTE means that a voice call service is fallen back. Further, the registration accept message (e.g., attach accept message) may include information on a selected fallback method, as described above.

5) When the registration is completed, the UE performs a procedure for IMS registration.

Figure 7:
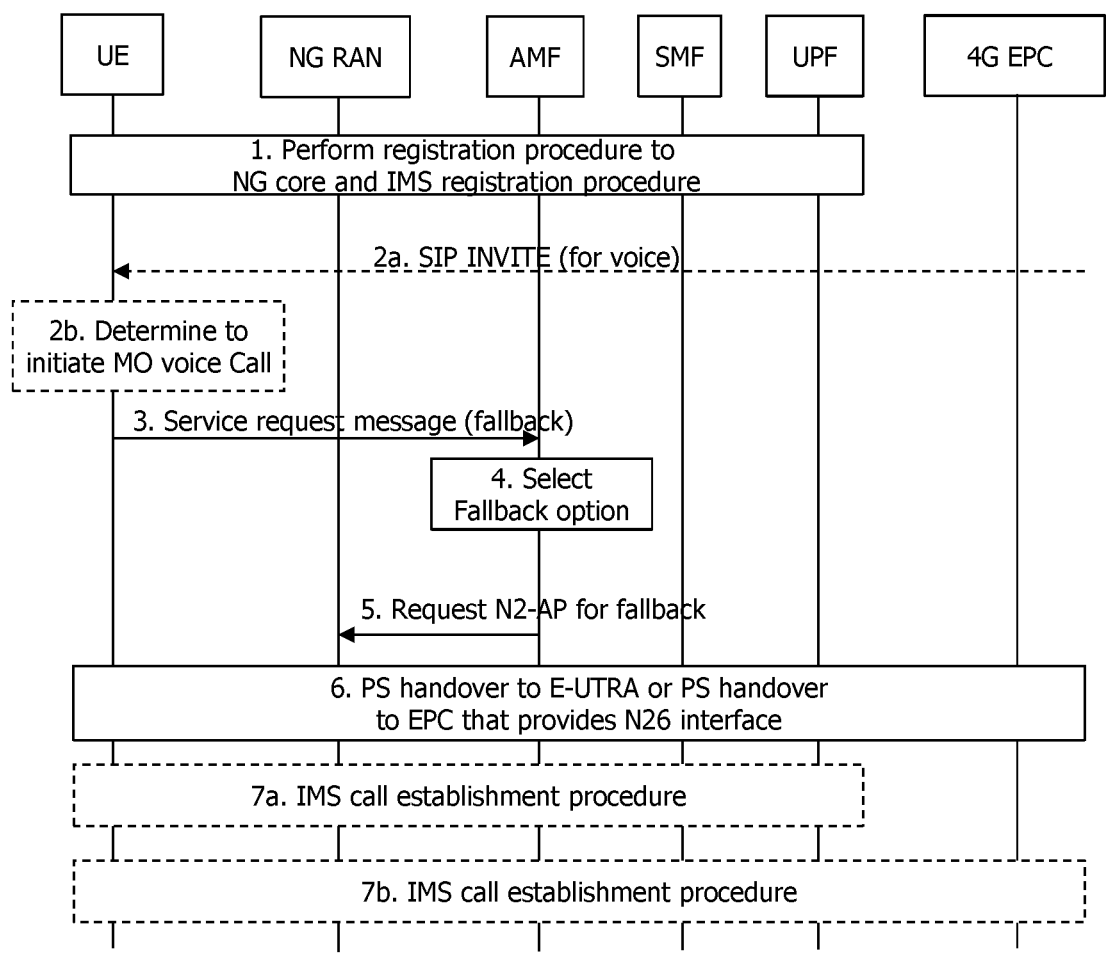
FIG. 7 is a diagram illustrating a method in which an AMF selects a fallback method at a time point in which an UE transmits a service request message for a MO/MT call according to a second scheme of a first disclosure of the present specification.

FIG. 7 is a diagram illustrating a method in which an AMF selects a fallback method at a time point in which an UE transmits a service request message for a MO/MT call according to a second scheme of a first disclosure of the present specification.

1) The UE performs both a procedure of registering to the NG core (e.g., 5G core) and an IMS registration procedure.

2) The UE receives a paging signal due to MT of a voice call and then receives an SIP INVITE message or determines MO of the voice call.

3) Thereafter, the UE transmits a service request message to the AMF. In this case, as described with reference to FIG. 6, the service request message may include indication indicating that fallback is required for a voice call service. The indication may be received from the AMF during a registration process. As described with reference to FIG. 6, the service request message may include information on a fallback method determined and delivered by the AMF.

4) The AMF selects a fallback method based on the information received from the UE and obtained various information as described with reference to FIG. 6. In this case, the AMF may select a fallback method different from a fallback method instructed by the information included in the service request message. For example, when information referred in selecting a specific fallback method is changed during the registration process shown in FIG. 6, the AMF may select another fallback method instead of a previously selected specific fallback method based on the changed information.

5) In order to perform a fallback operation for a voice call of the UE, the AMF may transmit an N2-AP request message to an NG RAN. Information on the selected fallback method may be included in the request message.

6) The NG RAN performs a fallback operation. A fallback method that may not be technically initiated in the NG RAN is excluded. A handover procedure is performed according to the fallback operation.

7) The UE performs inter-PS handover from a NG core (e.g., 5G core) to a 4G core (e.g., EPC) according to the fallback operation and then performs an IMS call establishment procedure.

Figure 8:
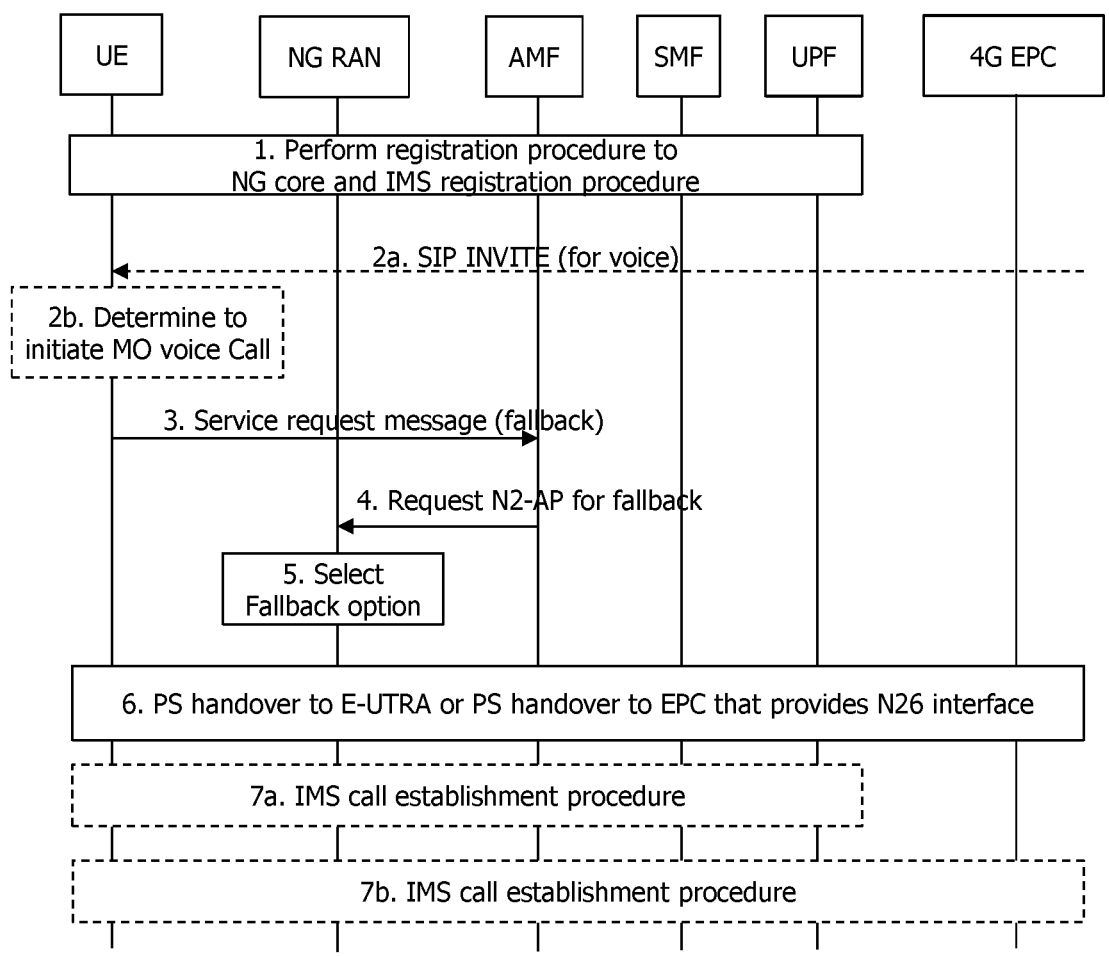
FIG. 8 is a diagram illustrating a method in which an NG RAN selects a fallback scheme by a request of an AMF at a time point in which an UE transmits a service request message for a MO/MT call according to a second scheme of a first disclosure of the present specification.

FIG. 8 is a diagram illustrating a method in which an NG RAN selects a fallback scheme by a request of an AMF at a time point in which an UE transmits a service request message for a MO/MT call according to a second scheme of a first disclosure of the present specification.

Most of steps of FIG. 8 are similar to those of FIG. 7. Hereinafter, only different steps will be described.

1-3) The steps are similar to steps 1-3 of FIG. 7, and therefore, the description of FIG. 7 is applied instead of redundant description.

4) In order to perform a fallback operation for a voice call of the UE, the AMF may transmit an N2-AP request message to an NG RAN. In this case, the AMF may transmit obtained various information to the NG RAN, as described above.

5) Therefore, the NG RAN selects a fallback method based on the obtained various information. In this case, various information referring for selecting the fallback method may be obtained by the AMF and delivered to the NG RAN or may be information obtained by the NG RAN.

II. Second Disclosure

In a situation in which an N26 interface is not provided and in which the UE may perform only a single-registration, the UE may not perform handover for a fallback operation, and the second disclosure of the present specification suggests a method of changing a core network according to an interworking procedure.

Figure 9:
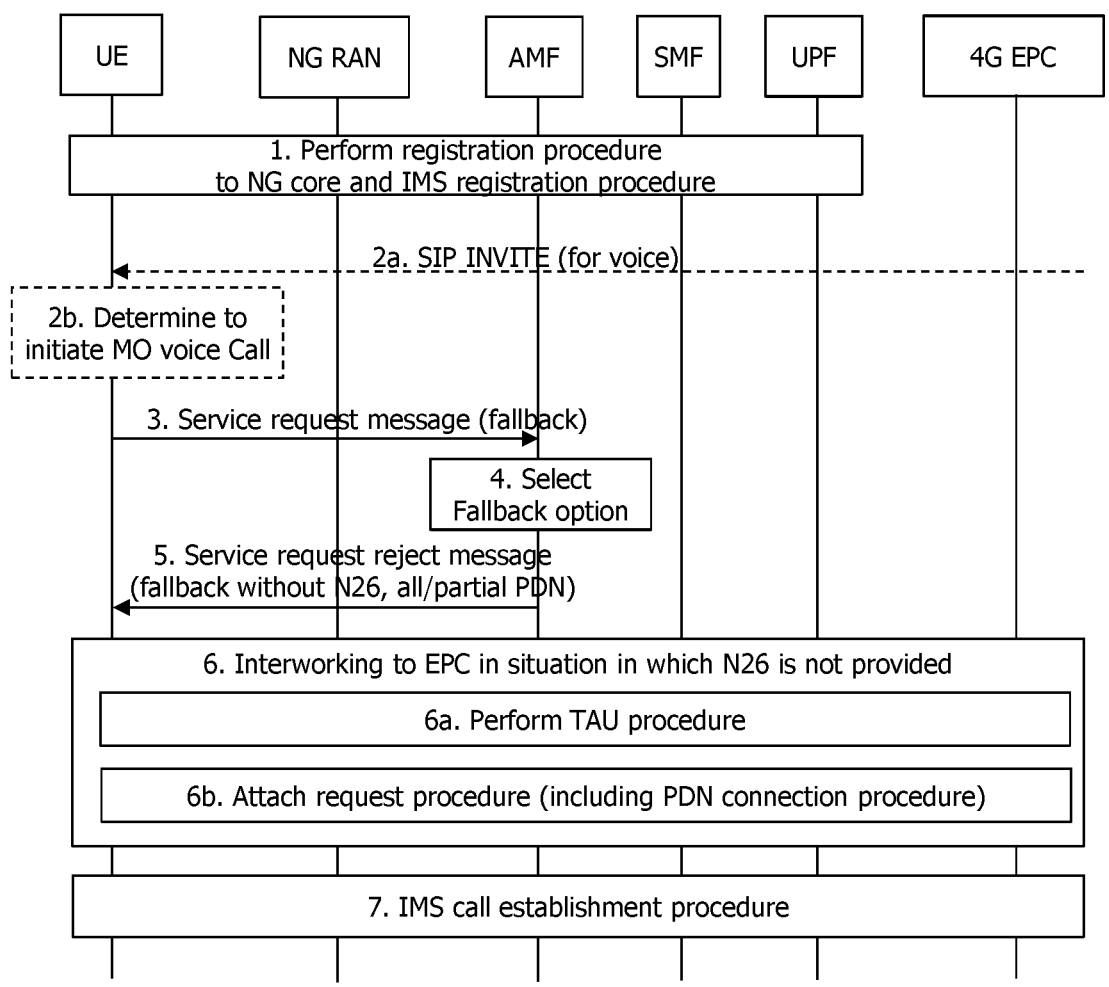
FIG. 9 is a flowchart illustrating a method in which a UE initiates a PDN connection request procedure for a fallback operation according to a first scheme of a second disclosure of the present specification.

FIG. 9 is a flowchart illustrating a method in which a UE initiates a PDN connection request procedure for a fallback operation according to a first scheme of a second disclosure of the present specification.

Most of steps of FIG. 9 are similar to those of FIG. 7. Hereinafter, only different steps will be described.

1-3) The steps are similar to steps 1-3 of FIG. 7, and therefore, the description of FIG. 7 is applied instead of redundant description.

4) The AMF selects a fallback method based on information received from the UE and obtained various information as described with reference to FIG. 6. In this case, the AMF may select a fallback method different from a fallback method instructed by information included in the service request message. For example, in FIG. 9, a fallback scheme of a name 'fallback without N26' is selected. The fallback scheme is a scheme (i.e., the UE changes a core network thereof to a 4G EPS) in which the UE initiates a fallback operation in an environment in which PS handover is not provided (e.g., an environment in which PS handover is not physically provided or is not politically provided).

5) The AMF transmits a service request reject message in response to the service request message. The service request reject message may include information on the selected fallback method. Here, the selected fallback scheme may be a scheme in which the UE initiates a fallback operation. The service request reject message may include information (e.g., shown all/partial PDN) requesting or instructing to fall back all sessions set to the current NG core (e.g., 5G core) or a session for only an IMS to the EPC.

6) Therefore, the UE performs a procedure similar to an interworking procedure of the case of performing a single-registration mode in an environment in which an N26 interface is not provided instead of performing a handover procedure for fallback. That is, the UE performs an attach procedure and a PDN connection establishment procedure to the EPC according to a request/instruction received from a network.

Specifically, the UE generates a GUTI for 4G from a GUTI for 5G and performs a TAU procedure using the generated GU for 4G. Therefore, an MME of the 4th generation EPC determines that a TAU is impossible because a previous serving node of the UE is an AMF of an NG core (e.g., 5th generation core) and transmits an indicator "Handover PDN Connection Setup Support" to the UE while transmitting a TAU reject message. The indicator means that it is required to perform the PDN connection setup procedure for handover.

Therefore, the UE transmits an attach request message including a PDN connection request message based on the instructor. In this case, the attach request message includes a "handover" indicator indicating that the attach request message is for handover. In this case, the UE transmits together information (e.g., IMS APN) necessary for IMS PDN session connection. When the information received from the network contains information that requests/instructs all or specific PDN connection other than an IMS PDN, the corresponding PDN connection may also be requested.

7) The UE performs a procedure (e.g., INS registration, IMS call establishment procedure) necessary for an IMS-based voice call with the EPC.

Figure 10:
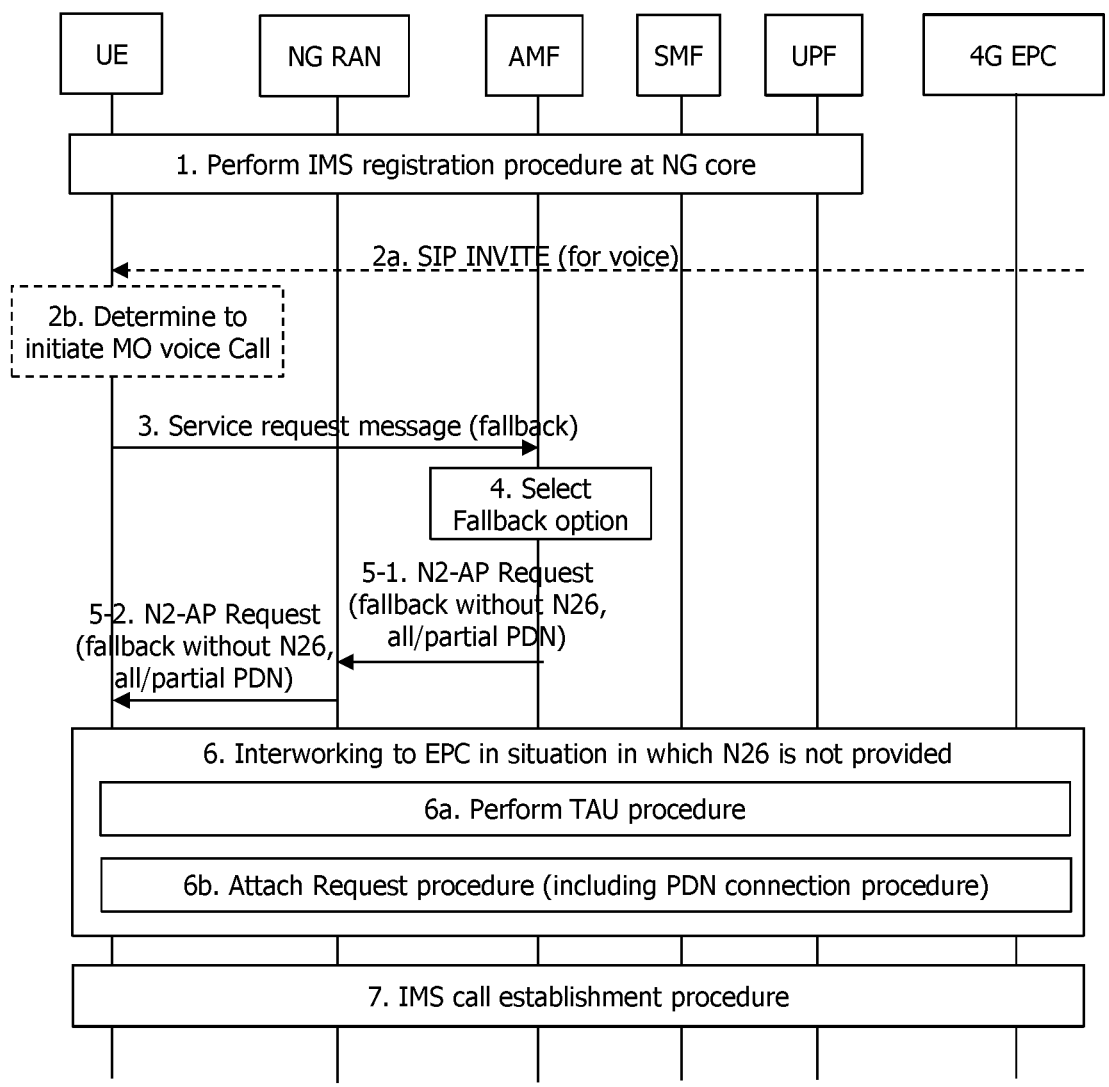
FIG. 10 is a flowchart illustrating a method in which an AMF requests a PDN connection request procedure to an NG RAN for a fallback operation according to a second scheme of a second disclosure of the present specification.

FIG. 10 is a flowchart illustrating a method in which an AMF requests a PDN connection request procedure to an NG RAN for a fallback operation according to a second scheme of a second disclosure of the present specification.

Most of steps of FIG. 10 are similar to those of FIG. 9. Hereinafter, only different steps will be described.

1-4) The steps are similar to steps 1-4 of FIG. 9, and therefore, the description of FIG. 9 is applied instead of redundant description.

5) In order to perform a fallback operation for a voice call of the UE, the AMF may transmit an N2-AP request message to an NG RAN. Information on the selected fallback scheme may be included in the message. Here, the selected fallback scheme may be a scheme in which the UE initiates a fallback operation. The message may include information (e.g., shown all/partial PDN) requesting or instructing to fall back all sessions currently set in the NG core (e.g., 5G core) or a session for only an IMS to the EPC. Therefore, the NG RAN transmits an RRC connection release message to the UE. The RRC connection release message may include information on the selected fallback method.

Unlike the step 4 of FIG. 10, the RAN instead of the AMF may select a fallback method. In this case, the AMF may obtain information necessary for selection of the fallback scheme and then transmit the information to the NG RAN. Alternatively, the NG RAN may obtain information necessary for selection of the fallback scheme.

6-7) The steps are similar to steps 6-7 of FIG. 9, and therefore, the description of FIG. 9 is applied instead of redundant description.

Figure 11:
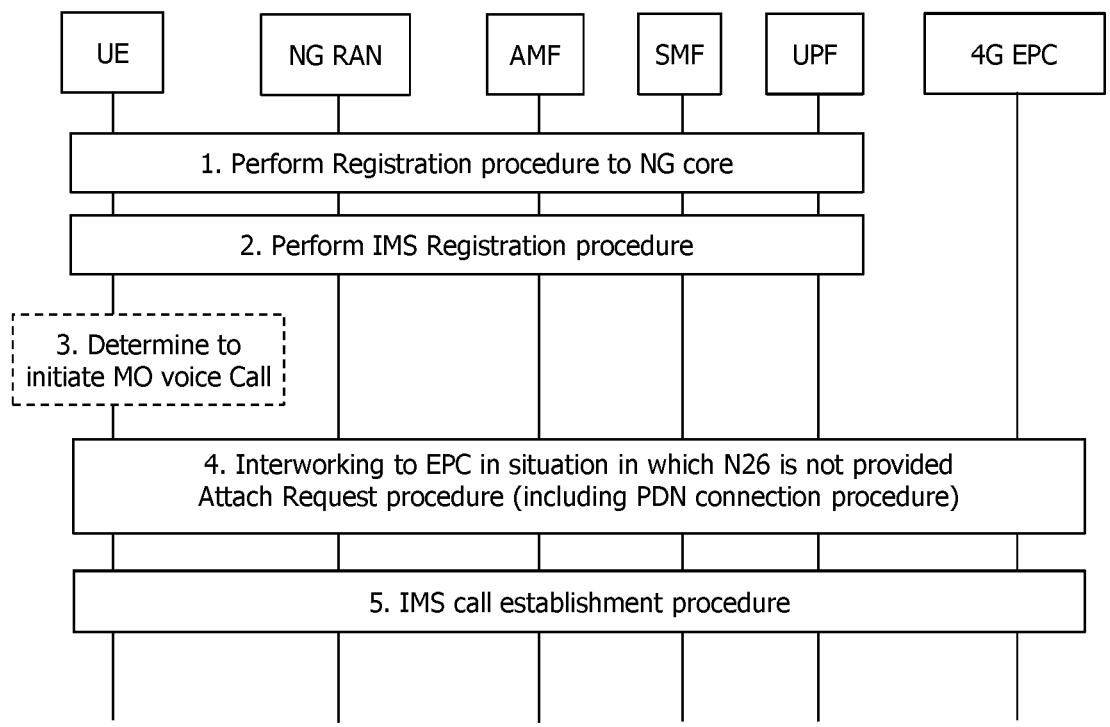
FIG. 11 is a flowchart illustrating an optimization method of minimizing delay according to a third scheme of a second disclosure of the present specification.

FIG. 11 is a flowchart illustrating an optimization method of minimizing delay according to a third scheme of a second disclosure of the present specification.

1) The UE performs a procedure of registering to a NG core (e.g., 5G core). In this case, as described with reference to FIG. 6, information on a fallback scheme selected by the network may be included in the registration accept message (e.g., attach accept message). The selected fallback method may be a fallback method of a name 'fallback without N26', as described above.

2) The UE performs an IMS registration procedure for a voice call service.

3) The UE determines MO of a voice call.

4) Therefore, the UE performs a fallback operation based on information on the fallback method received in the step 1). That is, in order to change the core network to a 4G EPC, the UE performs a PDN connection request procedure. That is, the UE immediately performs a PDN connection request procedure instead of transmitting a service request message.

5) The UE performs a procedure (e.g., INS registration, IMS call establishment procedure) necessary for an IMS-based voice call with the EPC.

III. Third Disclosure

Figure 12:
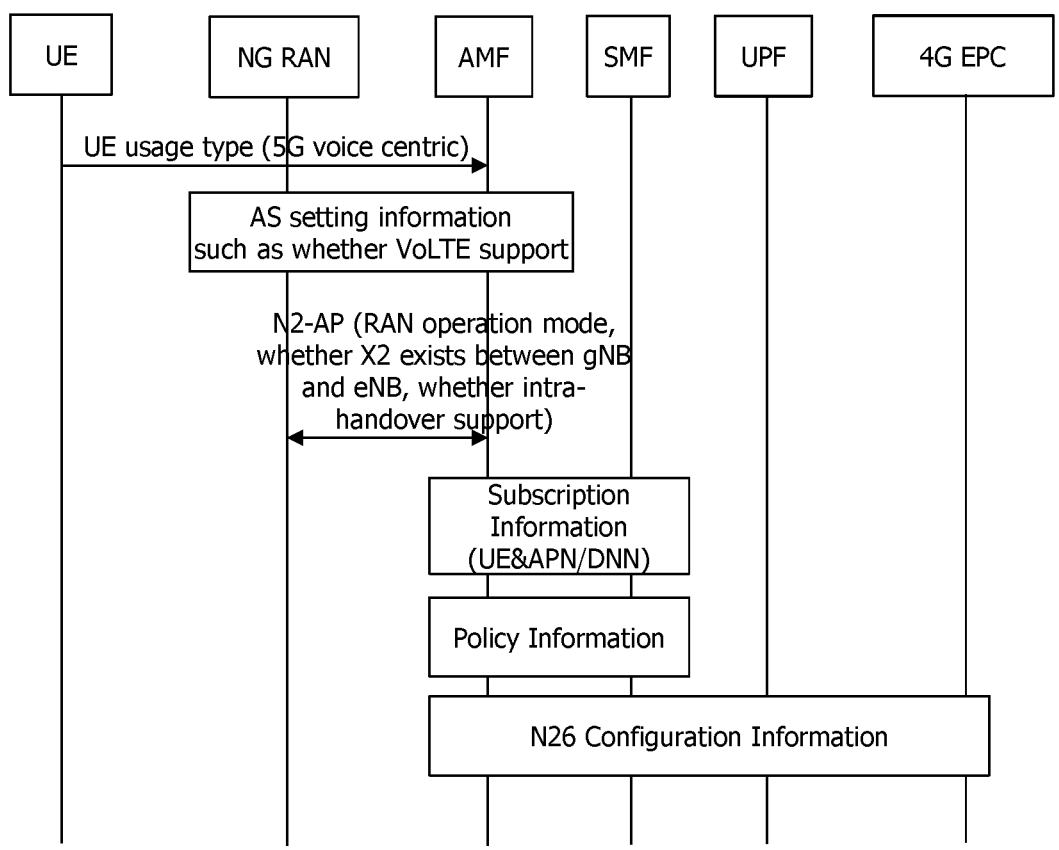
FIG. 12 is a flowchart illustrating a method of obtaining information necessary for fallback determination according to a third disclosure of the present specification.

FIG. 12 is a flowchart illustrating a method of obtaining information necessary for fallback determination according to a third disclosure of the present specification.

As can be seen with reference to FIG. 12, the AMF obtains information from the UE, the NG RAN (i.e., including the base station), and other network nodes in addition to its own information preset therein. In particular, the AMF may perform a procedure for determining an RAN operation mode to be described later in the section IV and whether an X2 interface exists between a gNB and an eNB in addition to AS setting information about VoLTE support from the base station.

IV. Fourth Disclosure: Broadcast Information about an Operating Mode of the Base Station and Operation of the UE According to the Broadcasting According to the fourth disclosure of the present specification, a base station of the NG RAN (or referred to as Evolved E-UTRAN) may operate in one of the following modes and the operation mode may be broadcasted to the UE through a signal/message (e.g., SIB).

i) S1 mode: This mode means that the base station of the NG RAN supports only access to a 4G EPC. Accordingly, the base station should perform an operation similar to that of an existing 4G RAN. In this manner, when the base station of the NG RAN operates in a mode S1, the base station may not broadcast information on an operation mode thereof.

ii) NG mode: This mode means that the base station of the NG RAN supports only access to the NG core (i.e., 5G core).

iii) S1 & NG mode: This mode means that the base station of the NG RAN provides both access to the 4G EPC and access to the NG core (i.e., 5G core).

Figure 13:
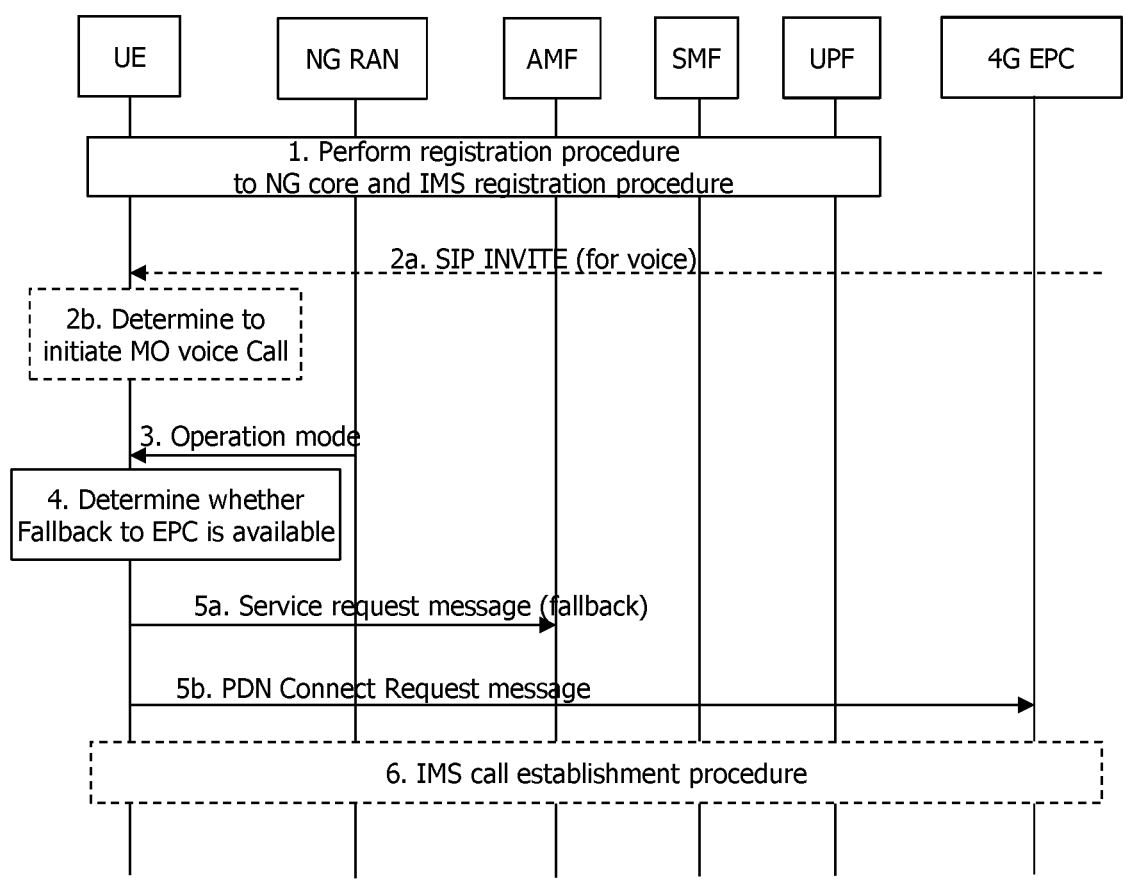
FIG. 13 illustrates a method of determining whether to fall back when an operation mode of a base station is broadcasted according to a fourth disclosure of the present specification.

FIG. 13 illustrates a method of determining whether to fall back when an operation mode of a base station is broadcasted according to a fourth disclosure of the present specification.

1) The UE performs both a procedure of registering to an NG core (e.g., 5G core) and an IMS registration procedure.

2) The UE receives a paging signal due to MT of the voice call and then receives an SIP INVITE message or determines MO of the voice call.

3) The UE determines an operation mode of a currently accessed RAN based on information included in a signal/message (e.g., SIB) broadcasted by the base station.

4) The UE determines whether fallback to an EPC is available through the corresponding base station. For example, when the current base station is operating in an S1 & NG mode that may be connected to two core networks (i.e., NG core and 4G EPC), the UE may determine that the UE may be fallen back to the EPC without change of the base station. When the base station is currently operating in an NG mode, the UE may determine that fallback requiring inter-RAT handover (HO) is required.

The determination may be performed based on other information preset to the UE in addition to information on the operation mode.

5) The UE may transmit a service request message or an attach request message including a PDN connection request message according to a determination result thereof.

6) The UE performs a fallback process.

The foregoing description may be implemented in hardware. This will be described with reference to the drawings.

Figure 14:
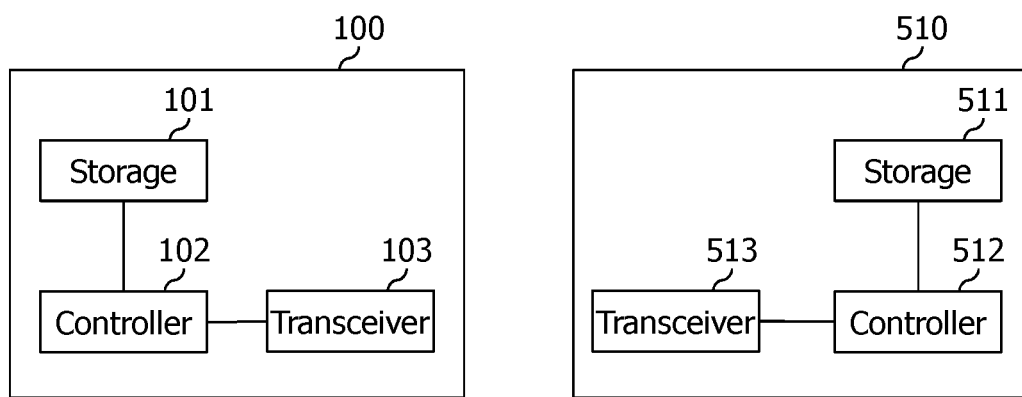
FIG. 14 is a block diagram illustrating a configuration of a UE 100 and a network node according to an embodiment of the present invention.

FIG. 14 is a block diagram illustrating a configuration of a UE and a network node according to an embodiment of the present invention.

As shown in FIG. 14, the UE (or UE) 100 includes a storage means 101, a controller 102, and a transceiver 103. The network node may be an access network (AN), a radio access network (RAN), an AMF, a CP function node, and an SMF. The network node includes a storage means 511, a controller 512, and a transceiver 513.

The storage means stores the above-described method.

The controllers control the storage means and the transceivers. Specifically, the controllers each execute the methods stored in the storage means. The controllers transmit the above-described signals through the transceivers.

While the invention has been described with reference to exemplary embodiments, the scope of the invention is not limited to specific embodiments, but the invention may be modified, changed, or improved in various forms within the spirit of the present invention and the scope described in claims.

What is claimed is:

1. A method of performing a fallback operation of a voice call when only a single-registration is performed in an environment in which an N26 interface between an Access and Mobility Management Function (AMF) and a Mobility Management Entity (MME) is not provided, the method performed by a user equipment (UE) and comprising:

performing, by the UE, a Next Generation (NG) core registration procedure and an IP Multimedia Subsystem (IMS) registration procedure;

determining, by the UE, a mobile orienting (MO) of a voice call;

transmitting, by the UE, a service request message to the AMF for originating or terminating the voice call;

receiving a service request reject message in response to the service request message from the AMF, wherein the service request reject message comprises information indicating a fallback operation without the N26 interface;

transmitting a Tracking Area Update (TAU) request message to the MME before transmitting an attach request message;

receiving from the MME a TAU reject message comprising an indicator indicating a packet data network (PDN) connection establishment procedure for handover is required, wherein the indicator is for Handover PDN Connection Setup Support; and transmitting, by the UE, the attach request message comprising a PDN connection request message to the MME based on the indicator.

2. The method of claim 1, wherein the attach request message comprises an indicator indicating that the attach request message is for handover.

3. The method of claim 1, further comprising:

receiving information about an operation mode from a base station of an NG Radio Access Network (NG RAN); and determining whether to perform a fallback operation based on the information about the operation mode.

4. The method of claim 3, wherein the operation mode comprises:

a first mode in which a base station of the NG RAN supports only access to an NG core;

a second mode in which the base station of the NG RAN supports only access to a 4G Evolved Packet Core (EPC); and a third mode in which the base station of the NG RAN supports both access to the NG core and access to the 4G EPC.

5. A user equipment (UE) for performing a fallback operation of a voice call when only a single-registration is performed in an environment in which an N26 interface between an Access and Mobility Management Function (AMF) and a Mobility Management Entity (MME) is not provided, the UE comprising:

a transceiver; and a processor configured to control the transceiver, wherein the processor is further configured to:

perform a Next Generation (NG) core registration procedure and an IP Multimedia Subsystem (IMS) registration procedure, determine a mobile orienting (MO) of a voice call, transmit a service request message to the AMF for originating or terminating the voice call, receive a service request reject message in response to the service request message from the AMF, wherein the service request reject message comprises information indicating a fallback operation without the N26 interface;

transmit a Tracking Area Update (TAU) request message to the MME before transmitting an attach request message, receive from the MME a TAU reject message comprising an indicator indicating a PDN connection establishment procedure for handover is required, wherein the indicator is for Handover PDN Connection Setup Support, and transmit the attach request message comprising a PDN connection request message to the MME based on the indicator.

6. The UE of claim 5, wherein the attach request message comprises an indicator indicating that the attach request message is for handover.

* * * * *